(12) United States Patent
He et al.

(10) Patent No.: US 11,465,213 B2
(45) Date of Patent: Oct. 11, 2022

(54) METHOD OF DESIGNING AND MANUFACTURING A HYDRAULIC VALVE BLOCK BASED ON SELECTIVE LASER MELTING

(71) Applicant: JIANGSU XCMG CONSTRUCTION MACHINERY RESEARCH INSTITUTE LTD., Xuzhou (CN)

(72) Inventors: Bing He, Xuzhou (CN); Yajie Liu, Xuzhou (CN); Pengfei Chen, Xuzhou (CN)

(*) Notice: Subject to any disclaimer, the term of this patent is extended or adjusted under 35 U.S.C. 154(b) by 0 days.

(21) Appl. No.: 17/347,600

(22) Filed: Jun. 15, 2021

(65) Prior Publication Data

US 2022/0250156 A1  Aug. 11, 2022

(30) Foreign Application Priority Data

Jan. 25, 2021 (CN) .......................... 202110098623.7

(51) Int. Cl.
*B33Y 10/00* (2015.01)
*B33Y 80/00* (2015.01)
(Continued)

(52) U.S. Cl.
CPC .............. *B22F 10/85* (2021.01); *B22F 10/28* (2021.01); *B33Y 10/00* (2014.12); *B33Y 50/02* (2014.12);
(Continued)

(58) Field of Classification Search
CPC .......... B22F 10/85; B22F 10/28; B33Y 10/00; B33Y 50/02; B33Y 80/00; G06F 30/10;
(Continued)

(56) References Cited

U.S. PATENT DOCUMENTS 9,574,578 B2 * 2/2017 Frick ...................... F15B 15/202
10,012,318 B2 * 7/2018 Morgan ................ F16K 11/044
(Continued)

FOREIGN PATENT DOCUMENTS

CN   106096158 A   11/2016
CN   107866568 A   4/2018
(Continued)

*Primary Examiner* — Lawrence Averick
(74) *Attorney, Agent, or Firm* — Kilpatrick Townsend & Stockton, LLP (57) ABSTRACT

The present disclosure provides a method of designing and manufacturing a hydraulic valve block based on selective laser melting. The method includes providing a machined hydraulic valve block, determining whether the machined hydraulic valve block needs weight reduction, if the machined hydraulic valve block needs weight reduction, taking reduction of the pressure loss of the flow channel as an optimization goal and optimizing the flow channel of the machined hydraulic valve block to obtain an optimized flow channel structure model, taking reduction of the weight of the hydraulic valve block as an optimization goal and optimizing solid portions of the optimized flow channel structure model by using a topology optimization method to obtain a three-dimensional solid structure model of a hydraulic valve block and printing the three-dimensional solid structure model by using selective laser melting to obtain the hydraulic valve block.

8 Claims, 5 Drawing Sheets

(51) Int. Cl.
    *B22F 10/28*     (2021.01)
    *B22F 10/85*     (2021.01)
    *B33Y 50/02*     (2015.01)
    *G06F 30/10*     (2020.01)
    *G06F 111/10*     (2020.01)
    *B23K 26/342*     (2014.01)
    *G06F 119/18*     (2020.01)

(52) U.S. Cl.
    CPC .............. *B33Y 80/00* (2014.12); *G06F 30/10* (2020.01); *B23K 26/342* (2015.10); *G06F 2111/10* (2020.01); *G06F 2119/18* (2020.01)

(58) Field of Classification Search
    CPC . G06F 2111/10; G06F 2119/18; B23K 26/342
    See application file for complete search history.

(56) References Cited

U.S. PATENT DOCUMENTS

| | | | |
|---|---|---|---|
| 11,236,953 B2 * | 2/2022 | de Bock | F28D 21/001 |
| 2014/0076154 A1 * | 3/2014 | Frick | B64C 13/504 |
| | | | 29/890.12 |
| 2015/0096631 A1 * | 4/2015 | Regan | F16L 41/023 |
| | | | 285/120.1 |
| 2016/0281865 A1 * | 9/2016 | Morgan | F16K 11/044 |
| 2017/0368498 A1 * | 12/2017 | He | B01D 71/32 |
| 2019/0352730 A1 * | 11/2019 | Chiba | B22F 10/28 |
| 2021/0156624 A1 * | 5/2021 | de Bock | F28F 13/08 |

FOREIGN PATENT DOCUMENTS

| | | |
|---|---|---|
| CN | 109695657 A | 4/2019 |
| CN | 110625115 A | 12/2019 |

* cited by examiner

METHOD OF DESIGNING AND MANUFACTURING A HYDRAULIC VALVE BLOCK BASED ON SELECTIVE LASER MELTING

CROSS-REFERENCES TO RELATED APPLICATIONS

The present application claims benefit of Chinese Application No. 202110098623.7, filed on Jan. 25, 2021, the contents of which are hereby incorporated by reference in its entirety.

FIELD

The present disclosure relates to a method of designing and manufacturing a hydraulic valve block based on selective laser melting.

BACKGROUND

A hydraulic system refers to a whole set of devices that takes oil as a working medium and uses the pressure energy of the oil to manipulate operation of a hydraulic actuating mechanism through a control valve and other accessories. The hydraulic system includes power elements (various hydraulic pumps), actuating elements (hydraulic cylinders and hydraulic motors, etc.), control elements (various hydraulic valve blocks), auxiliary elements (valves and other accessories) and a working medium (oil). The hydraulic system is now widely used in fields of mechanical devices such as engineering machinery, agricultural machinery, automobiles, aircrafts and ships, dam devices for water engineering, turbine speed regulation devices for power plants, and artillery manipulation devices in the military industry, etc.

A hydraulic valve block, as a control element of the hydraulic system, plays a role of controlling and regulating the pressure, flow and direction of the oil, and is a component in each device. The manufacturing of the machined hydraulic valve block includes that oil circuits are arranged on a forging blank and then drilling is performed, so that inside the forging blank, there are, a large number of 90° right-angle cross pore passages and fabrication holes that are used for ensuring the run-through of internal flow channels and are not necessarily required. The right-angle cross pore passages and fabrication holes result in that the pressure loss of the machined hydraulic valve block is increased, and it is easy to generate defects such as vibration, noise and cavitation, and the structural reliability and service life of the machined hydraulic valve block structure are reduced.

The metal 3D printing technology, as a forward-looking manufacturing technology, is not limited by the complexity degree of structures of parts, can manufacture parts and components of any complex shapes, can improve the design freedom of product designers, supports the design innovation of new products and components, and provides new technical means for the development of the hydraulic technology. The selective laser melting process (SLM process) is one of the metal 3D printing technologies, which is suitable for manufacturing and customized production of special hydraulic valve blocks with high performances.

SUMMARY

An objective of the present disclosure is to provide a method of designing and manufacturing a hydraulic valve block based on selective laser melting, in order to obtain a hydraulic valve block that is printed by using selective laser melting and the weight of the hydraulic valve block is smaller than the machined hydraulic valve block.

The present disclosure provides a method of designing and manufacturing a hydraulic valve block based on selective laser melting, including the following steps:

providing a machined hydraulic valve block;

determining whether the machined hydraulic valve block needs weight reduction according to the working conditions of the machined hydraulic valve block and the static strength and fatigue strength of the machined hydraulic valve block;

if the machined hydraulic valve block needs weight reduction, taking reduction of the pressure loss of the flow channel as an optimization goal and optimizing the flow channel of the machined hydraulic valve block to obtain an optimized flow channel structure model;

taking reduction of the weight of the hydraulic valve block as an optimization goal and optimizing solid portions of the optimized flow channel structure model by using a topology optimization method to obtain a three-dimensional solid structure model of a hydraulic valve block; and printing the three-dimensional solid structure model by using selective laser melting to obtain the hydraulic valve block.

In some embodiments, the step of optimizing the flow channel of the machined hydraulic valve block to obtain an optimized flow channel structure model includes:

splitting the flow channel of the machined hydraulic valve block into at least two sub-flow channel and creating at least two sub-flow channel parameterization models;

parametrically optimizing each sub-flow channel parameterization model to obtain at least two sub-flow channel optimization models; and integrating the at least two sub-flow channel optimization models to obtain the optimized flow channel structure model.

In some embodiments, the step of optimizing the flow channel of the machined hydraulic valve block to obtain an optimized flow channel structure model further includes:

after the flow channel of the machined hydraulic valve block is split and before creating at least two sub-flow channel parameterization models, removing fabrication holes in the machined hydraulic valve block, and determining optimized parameters of each sub-flow channel to establish sub-flow channel parameterization models.

In some embodiments, the step of parametrically optimizing each sub-flow channel parameterization model to obtain at least two sub-flow channel optimization models includes: taking the minimum pressure loss of the flow channel under various working conditions as an optimization goal, and using a response surface optimization analysis method to obtain the sub-flow channel optimization models in the case that the pressure loss is the minimum.

In some embodiments, the method of designing and manufacturing a hydraulic valve block based on selective laser melting further includes: before the solid portions of the flow channel structure model is optimized by using the topology optimization method, obtaining the minimum wall thickness of the flow channel that ensures the flow channel is not broken through by pressure; and topologically optimizing parts other than minimum wall thickness of solid portion by the topology optimization method.

In some embodiments, the step of topologically optimizing the parts other than minimum wall thickness of solid portion by the topology optimization method includes:

determining the optimization goal, the design variable, and the constraint conditions under various working conditions of the hydraulic valve block, and performing structure discretization and optimization on the hydraulic valve block.

In some embodiments, the mathematical model topologically optimized can be represented as:

optimization goal: min $C=f(\rho)=F^TU$
design variable: $\rho=\{\rho_1,\rho_2,\ldots,\rho_i,\ldots,\rho_N\}^T \epsilon \Omega_N$
design space: $0<\rho_{min}\leq\rho_i\leq 1$ i=1,2,\ldots,N
constraint condition:

$$V^* = \sum_{i=1}^{N}\rho_i v_i = A\%V$$

F=KU where $\rho$ is a design variable, C is the overall flexibility of the hydraulic valve block, F is an applied load, U is a displacement matrix, V is the volume of the machined hydraulic valve block, V* is the volume of the hydraulic valve block, A is the weight reduction goal, and K is a global stiffness matrix.

In some embodiments, the designing and manufacturing method further includes performing finite element analysis on the three-dimensional solid structure model to obtain the strength and service life of the three-dimensional solid structure model.

Based on the embodiments provided by the present disclosure, the method of designing and manufacturing a hydraulic valve block based on selective laser melting, includes the following steps: providing a machined hydraulic valve block; determining whether the machined hydraulic valve block needs weight reduction according to the working conditions of the machined hydraulic valve block and the static strength and fatigue strength of the machined hydraulic valve block; if the machined hydraulic valve block needs weight reduction, taking reduction of the pressure loss of the flow channel as an optimization goal and optimizing the flow channel of the machined hydraulic valve block to obtain an optimized flow channel structure model; taking reduction of the weight of the hydraulic valve block as an optimization goal and optimizing solid portions of the optimized flow channel structure model by using a topology optimization method to obtain a three-dimensional solid structure model of a hydraulic valve block and printing the three-dimensional solid structure model by using selective laser melting to obtain the hydraulic valve block. In the method of designing and manufacturing a hydraulic valve block in the present disclosure, the internal flow channel of the hydraulic valve block is optimized at first to reduce the pressure loss of the flow channel, then the solid portion of the hydraulic valve block is optimized by using the topology optimization method to reduce the weight of the hydraulic valve block, reduction of the pressure loss of the flow channel effectively improves the liquid flow efficiency, and reduction of the weight of the hydraulic valve block causes reduction of the weight of a whole hydraulic system, and in turn reduces energy consumption. In addition, the method of designing and manufacturing a hydraulic valve block also uses the selective laser melting printing technology to print the hydraulic valve block to realize manufacturing and forming of hydraulic valve blocks with complex structures.

Other features of the present disclosure and the advantages thereof will become clear from the following detailed description of exemplary embodiments of the present disclosure with reference to the accompanying drawings.

BRIEF DESCRIPTION OF THE DRAWINGS

In order to illustrate the embodiments of the present disclosure clearly, the accompanying drawings required in description of the embodiments will be briefly introduced below. The accompanying drawings in the following description are merely some of the embodiments stated in the present disclosure.

DETAILED DESCRIPTION OF THE INVENTION

The embodiments of the present disclosure will be further described in detail below through the embodiments in conjunction with the accompanying drawings. It should be understood that the specific embodiments described herein are merely for explaining the present disclosure and are not intended to limit the present disclosure.

An embodiment of the present disclosure provides a method of designing and manufacturing a hydraulic valve block based on selective laser melting. The designing and manufacturing method parametrically optimizes a flow channel structure and topologically optimizes a valve block structure respectively according to actual working conditions, and the structural strength and the service life are considered at the same time, so that finally, the pressure loss of the hydraulic valve block is reduced by 25%, the weight is reduced by 40%, the liquid flow efficiency is effectively improved, and material waste is avoided. Moreover, positions of ports of the hydraulic valve block in the embodiment of the present disclosure are the same as those of ports of the machined hydraulic valve block, the hydraulic valve block can be still mounted in the original equipment and structure after completion of the optimization.

Figure 1:
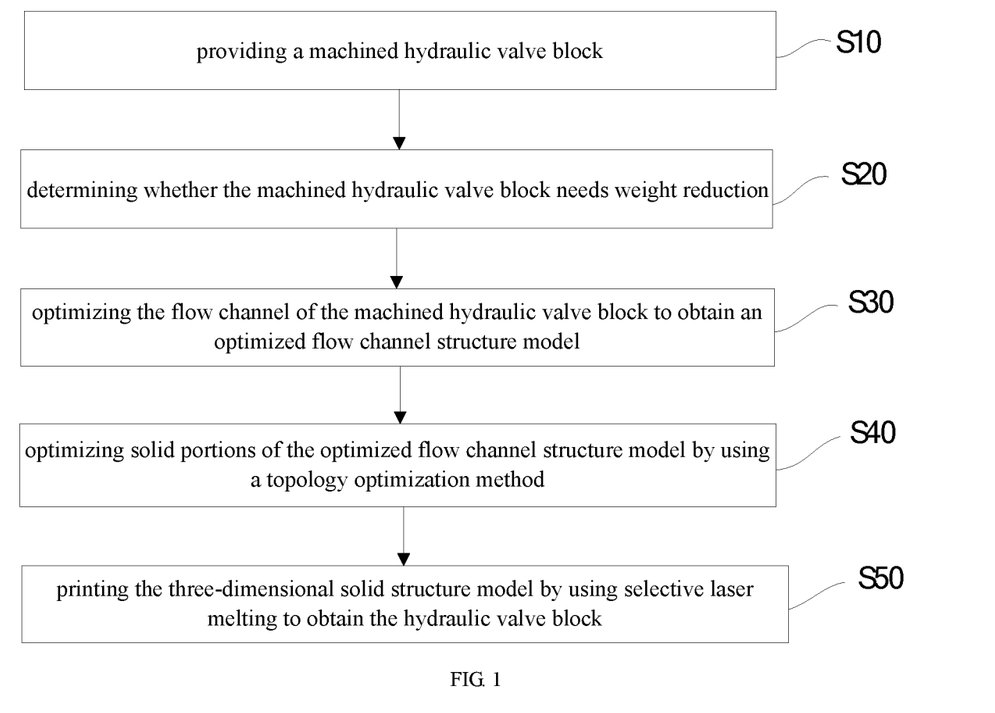
FIG. 1 is a flow schematic diagram of a method of designing and manufacturing a hydraulic valve block based on selective laser melting according to an embodiment of the present disclosure.

Referring to FIG. 1, the method of designing and manufacturing a hydraulic valve block based on selective laser melting provided by the embodiment of the present disclosure includes the following steps:

S10, providing a machined hydraulic valve block;

S20, determining whether the machined hydraulic valve block needs weight reduction according to the working conditions of the machined hydraulic valve block and the static strength and fatigue strength of the machined hydraulic valve block;

S30, if the machined hydraulic valve block needs weight reduction, taking reduction of the pressure loss of the flow channel as an optimization goal and optimizing the flow channel of the machined hydraulic valve block to obtain an optimized flow channel structure model;

S40, taking reduction of the weight of the hydraulic valve block as an optimization goal and optimizing solid portions of the optimized flow channel structure model by using a topology optimization method to obtain a three-dimensional solid structure model of a hydraulic valve block; and S50, printing the three-dimensional solid structure model by using selective laser melting to obtain the hydraulic valve block.

In the method of designing and manufacturing a hydraulic valve block in the present disclosure, the internal flow channel of the hydraulic valve block is optimized at first to reduce the pressure loss of the flow channel, then the solid portion of the hydraulic valve block is optimized by using the topology optimization method to reduce the weight of the hydraulic valve block, reduction of the pressure loss of the flow channel effectively improves the liquid flow efficiency, and reduction of the weight of the hydraulic valve block causes reduction of the weight of a whole hydraulic system, and in turn reduces energy consumption. In addition, the method of designing and manufacturing a hydraulic valve block also uses the selective laser melting printing technology to print the hydraulic valve block to realize manufacturing and forming of hydraulic valve blocks with complex structures.

In some embodiments, before the structure of the hydraulic valve block is optimized, it needs to determine first whether the machined hydraulic valve block needs weight reduction, that is to say, in the case of effectively ensuring the static strength and fatigue strength of the machined hydraulic valve block, if the machined hydraulic valve block has a room for weight reduction, the structure of the machined hydraulic valve block can be optimized in this case. The method of designing and manufacturing a hydraulic valve block needs to ensure the strength and service life of the hydraulic valve block at first.

Specifically, the step of determining whether the machined hydraulic valve block needs weight reduction according to the working conditions of the machined hydraulic valve block and the static strength and fatigue strength of the machined hydraulic valve block includes:

determining the working conditions of the machined hydraulic valve block: the actual working conditions of the machined hydraulic valve block is determined according to the function and basic principle of the hydraulic valve block; and determining that machined hydraulic valve block has a room for weight reduction: the static strength and fatigue strength of the machined hydraulic valve block are analyzed, and it is determined that the valve block has a room for weight reduction. For example, the static strength and fatigue strength of the machined hydraulic valve block are greater than the strength that required by the working conditions.

In some embodiments, the step of optimizing the flow channel of the machined hydraulic valve block to obtain an optimized flow channel structure model: splitting the flow channel of the machined hydraulic valve block into at least two sub-flow channel and building at least two sub-flow channel parameterization models; parametrically optimizing each sub-flow channel parameterization model to obtain at least two sub-flow channel optimization models; and integrating the at least two sub-flow channel optimization models to obtain the optimized flow channel structure model.

In one embodiment, the step of splitting the flow channel of the machined hydraulic valve block into at least two sub-flow channel and building at least two sub-flow channel parameterization models includes: first extracting the flow channel structure of the machined hydraulic valve block, and obtaining positions and numbers of right-angle flow channels, zigzag flow channels, fabrication holes and mounting fixing holes, splitting the flow channel structure into at least two sub-flow channel according to the actual working conditions, and building sub-flow channel fluid models. Then analyzing performances of each sub-flow channel under the original structure, including flow velocity distribution and pressure loss. Removing the fabrication holes in the flow channel of the machined hydraulic valve block, analyzing the flow channel structure under each working condition, performing smooth transition processing on the original flow channel structure of the machined hydraulic valve block, determining optimizable parameters of each sub-flow channel structure and the value interval of each parameter, and establishing a flow channel parameterization model under each working condition.

In some embodiments, the step of optimizing the flow channel of the machined hydraulic valve block to obtain an optimized flow channel structure model further includes: after the flow channel of the machined hydraulic valve block is split and before creating at least two sub-flow channel parameterization models, fabrication holes in the machined hydraulic valve block, and determining optimized parameters of each sub-flow channel to establish sub-flow channel parameterization models.

In some embodiments, the step of parametrically optimizing each sub-flow channel parameterization model to obtain at least two sub-flow channel optimization models includes: taking the minimum pressure loss of the flow channel under each working condition as an optimization goal, and using a response surface optimization analysis method to obtain the relationship between the pressure loss and various structure parameters and the sub-flow channel optimization model in the case that the pressure loss is the minimum.

Specifically, a response surface optimization analysis method is used, a response surface optimization test is designed, and the minimum pressure loss of the flow channel under each working condition is taken as an optimization goal to obtain the relationship between the pressure loss and various structure parameters and the sub-flow channel optimization model under each working condition in the case that the pressure loss is the minimum.

After each sub-flow channel optimization model is acquired, the pressure loss of the flow channel structure under each working condition after optimization is calculated, and is compared with the pressure loss of the flow channel under each working condition before optimization, and the percentage of reduction of the pressure loss of the flow channel under each working condition is determined.

According to the printing direction preliminarily determined, in order to effectively reduce support structures inside the flow channel and improve the surface quality of the internal flow channel, a drop-shaped flow channel is designed for pipelines with larger diameters.

In some embodiments, the designing and manufacturing method further includes: first determining a non-design space of the hydraulic valve block before the flow channel structure model is optimized by using the topology optimization method. The hydraulic valve block includes a solid portion and a flow channel portion disposed on the inner side of the solid portion, and the flow channel portion is hollow, and the designing and manufacturing method in some embodiments first designs the hollow flow channel portion before designing the solid portion of the hydraulic valve block. The solid portion of the hydraulic valve block needs to first ensure the wall thickness of the flow channel, that is to say, in the case of ensuring the wall thickness of the flow channel, the part other than the wall thickness is designed. The non-design space mentioned above refers to a part of the solid portion of the hydraulic valve block that is used to serve as the wall thickness of the flow channel.

In some embodiments, the determining a non-design space of the hydraulic valve block includes: analyzing the relationship between the inner pressure and wall thickness of the flow channel to obtain the minimum wall thickness of the flow channel, and obtaining the non-design space of the hydraulic valve block according to the minimum wall thickness of the flow channel. Specifically, the relationship between the inner pressure and wall thickness of the flow channel is analyzed to obtain the minimum wall thickness that ensures the flow channel is not broken through by pressure; and meanwhile, the minimum wall thickness of the internal flow channel of the valve block is determined according to a design standard for the valve block wall thickness, and is taken as the non-design space topologically optimized of the valve block structure.

In some embodiments, after the non-design space of the hydraulic valve block is determined, the topology optimization method is used to topologically optimize parts other than the non-design space of the hydraulic valve block.

Specifically, the topologically optimizing the space other than the non-design space of the hydraulic valve block includes: determining the optimization goal, design variable, and constraint condition under various working conditions of the hydraulic valve block, performing structure discretization and optimization the hydraulic valve block. The valve block is subjected to structure discretization and optimization solution to obtain a valve block model. If the model converges in the discretization and solution process, a topology form of the valve block model under each working condition is obtained, and an optimization model is output, otherwise, structure discretization and optimization solution are re-performed.

After the optimization model is obtained, Boole summation is performed on the optimization model under each working condition to obtain a topological result mathematical model that satisfies multiple working conditions of the valve block at the same time. Three-dimensional model reconstruction is performed on the topological result mathematical model to obtain the final optimized three-dimensional solid structure model of the hydraulic valve block.

In some embodiments, the designing and manufacturing method further includes performing finite element analysis on the three-dimensional solid structure model to obtain the strength and service life of the three-dimensional solid structure model. Specifically, finite element analysis software is used to analyze the structural strength of the optimized valve block under extreme working conditions. If there is a structural stress concentration phenomenon, the method proceeds to the topology optimization step, and performs partial processing and improvement on the post-topological model until the structural strength requirements are met. In addition, finite element analysis software is used to analyze the service life of the optimized valve block under extreme working conditions. If the service life does not meet the actual demand, the method proceeds to the topology optimization step, and performs partial processing and improvement on the post-topological model until the service life requirements are met.

After the strength and service life of the hydraulic valve block are verified, the selective laser melting process is used to perform three-dimensional printing and forming of the optimized valve block to obtain the finally designed three-dimensional solid model of the optimized structure.

The method of designing and manufacturing a hydraulic valve block of a specific embodiment is taken as an example below for detailed description.

Figure 2:
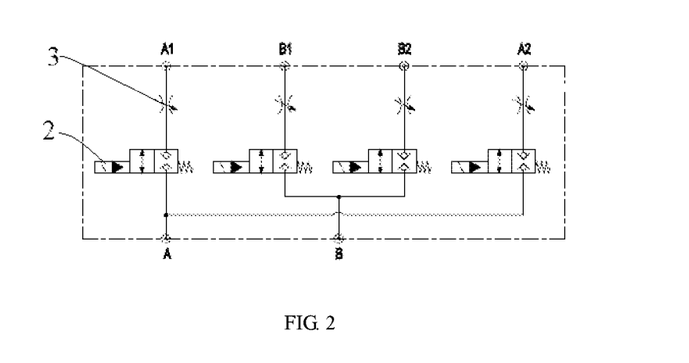
FIG. 2 is an elementary structural diagram of an integrated valve bank according to an embodiment of the present disclosure.
Figure 3:
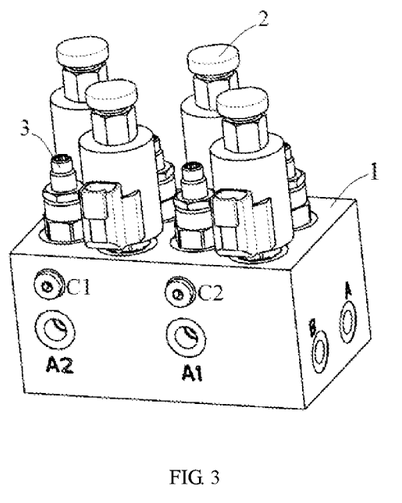
FIG. 3 is a structural schematic diagram of an integrated valve bank consisting of the machined hydraulic valve block.
Figure 4:
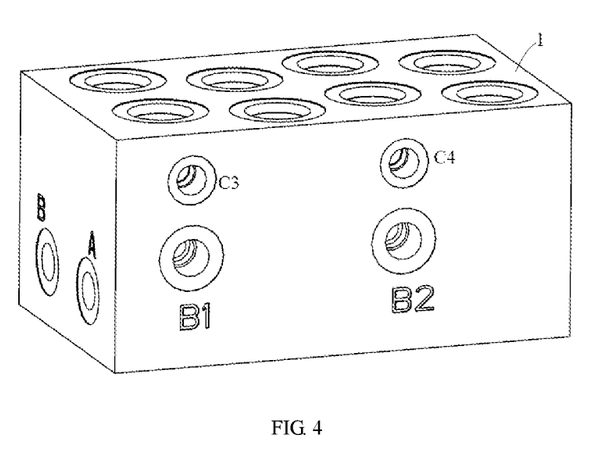
FIG. 4 is a structural schematic diagram of the machined hydraulic valve block in FIG. 3.

FIG. 2 is a working principle diagram of an integrated valve bank of this embodiment, FIG. 3 is a structural diagram of an integrated valve bank composed of a machined hydraulic valve block designed and manufactured using the traditional processing method, and FIG. 4 is a structural diagram of the machined hydraulic valve block in FIG. 3. In combination with FIG. 2 to FIG. 4, the integrated valve bank in this embodiment includes a machined hydraulic valve block 1, four groups of electromagnetic switch valves 2 and four groups of throttles 3, the machined hydraulic valve block 1 is provided with an oil inlet A, a first oil inlet A1, a second oil inlet A2, an oil outlet B, a first oil outlet B1, a second oil outlet B2, a first fabrication hole C1, a second fabrication hole C2, a third fabrication hole C3, a fourth fabrication hole C4, four valve block fixed mounting threaded holes, four electromagnetic switch valve mounting threaded holes and four throttle valve mounting threaded holes. As shown in FIG. 3 and FIG. 4, the four fabrication holes are disposed on side faces of the machined hydraulic valve block 1, the four valve block fixed mounting threaded holes (not shown in the figures, and located at the bottom surface of the machined hydraulic valve block 1) are used for fixing the machined hydraulic valve block 1, the four electromagnetic switch valve mounting threaded holes are used for fixing the electromagnetic switch valve 2, the four throttle valve mounting threaded holes are used for fixing the throttles 3, as shown in FIG. 4, and the four electromagnetic switch valve mounting threaded holes and the four throttle valve mounting threaded holes are formed in the top surface of the hydraulic valve block 1.

The process of the method of designing and manufacturing a hydraulic valve block of this embodiment is described in detail below according to FIG. 5.

The method of designing and manufacturing a hydraulic valve block provided by this embodiment is to optimize the machined hydraulic valve block that requires weight reduction and performance improvement on the basis of ensuring the structural strength and service life of the valve block, and ensure that the optimized valve block still can match the original mounting components, that is, positions of the ports are unchanged.

Figure 5:
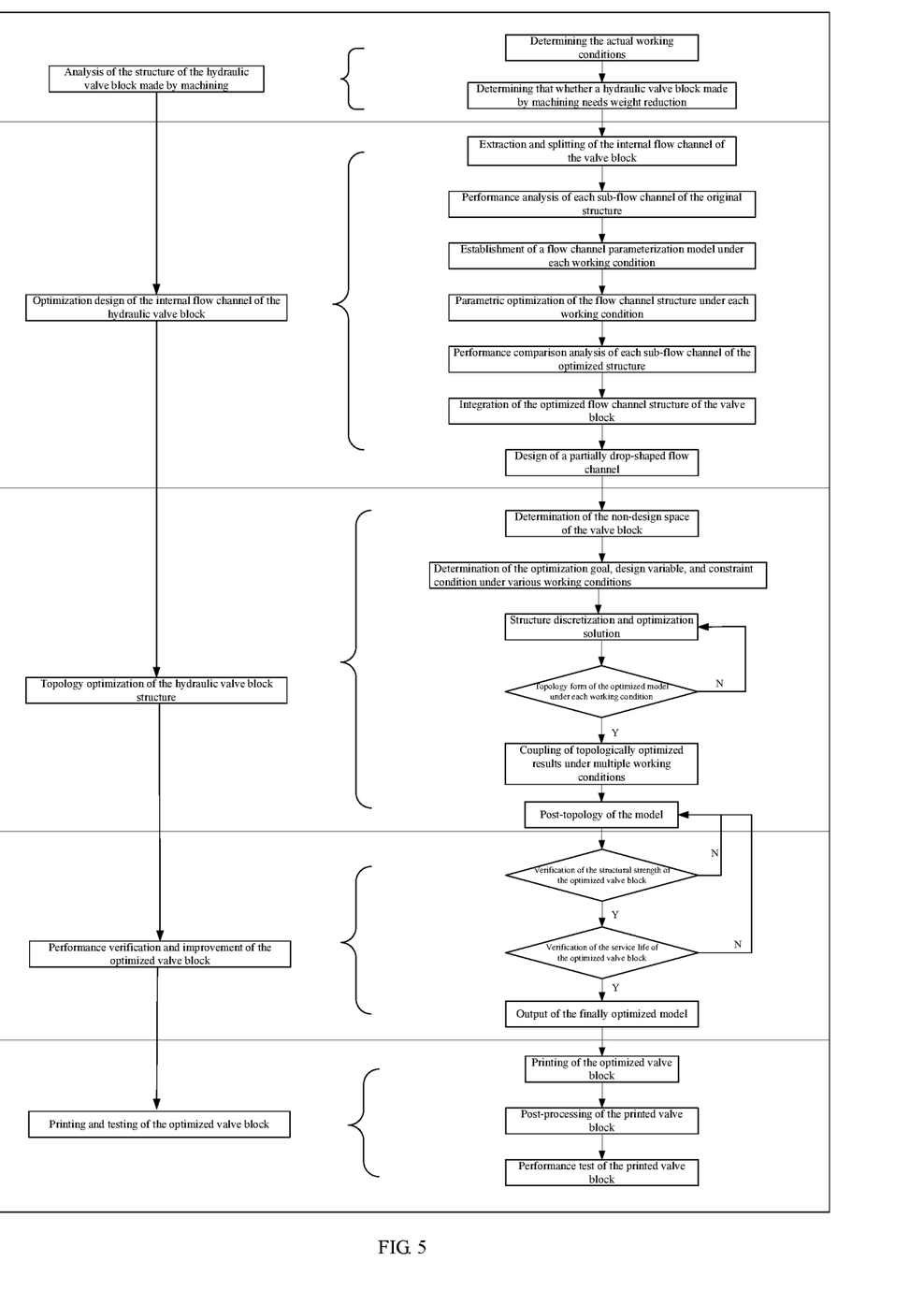
FIG. 5 is a structural schematic diagram of a flow schematic diagram of a method of designing and manufacturing a hydraulic valve block based on selective laser melting according to another embodiment of the present disclosure.

FIG. 5 is a flow chart of the method of designing and manufacturing a hydraulic valve block, and its embodiments mainly includes the following steps:

Step 1: analysis of the structure of the machined hydraulic valve block

It specifically includes:

1. Determining the actual working conditions of the machined hydraulic valve block: the actual working conditions of the machined hydraulic valve block is determined according to the function and basic principle of the machined hydraulic valve block; and 2. Determining that the hydraulic valve block has a room for weight reduction: the static strength and fatigue strength of the machined hydraulic valve block are analyzed, and it is determined that the valve block has a room for weight reduction.

Step 2: optimization design of the internal flow channel of a hydraulic valve block It specifically includes:

1. Extraction and splitting of the internal flow channel of the machined hydraulic valve block: the internal flow channel structure of the machined hydraulic valve block is extracted first, positions and numbers of right-angle flow channels, zigzag flow channels, process hole cavities and mounting fixing holes are analyzed, the flow channel structure is split according to the actual working conditions, and each sub-flow channel fluid model is built;

2. Performance analysis of each sub-flow channel of the original structure of the machined hydraulic valve block: performances of each sub-flow channel are analyzed under the original structure, including flow velocity distribution and pressure loss;

3. Establishment of a flow channel parameterization model under each working condition: removing the fabrication holes in the flow channel of the original structure of the machined hydraulic valve block, the flow channel structure under each working condition is analyzed, smooth transition processing is performed on the original flow channel structure, optimizable parameters of each sub-flow channel structure and the value interval of each parameter are determined, and the flow channel parameterization model under each working condition is established.

Figure 6:
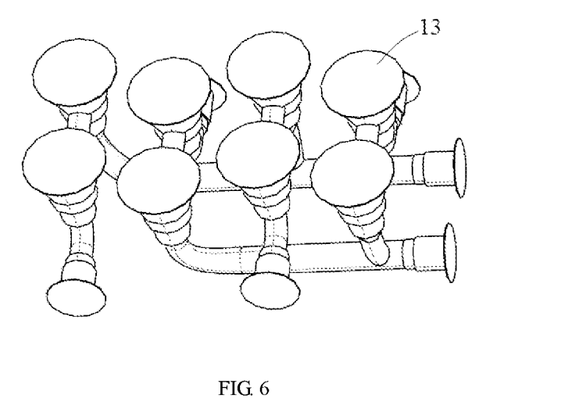
FIG. 6 is a structural schematic diagram of an optimized flow channel structure model according to embodiments of the present disclosure.

4. Parametric optimization of the flow channel structure under each working condition: a response surface optimization analysis method is used, a response surface optimization test is designed, and the minimum pressure loss of the flow channel under each working condition is taken as an optimization goal to obtain the relationship between the pressure loss and various structure parameters and the flow channel structure model under each working condition in the case that the pressure loss is the minimum;

5. Performance comparison analysis of the flow channel under each working condition of the optimized structure: the pressure loss of the flow channel structure under each working condition after optimization is calculated, and is compared with the pressure loss of the flow channel under each working condition before optimization, and the percentage of reduction of the pressure loss of the flow channel under each working condition is determined;

6. Integration of the optimized flow channel structure: the flow channel optimization model under each working condition is integrated to obtain an optimized flow channel structure model 13 of the complete hydraulic valve block as shown in FIG. 6.

Figure 7:
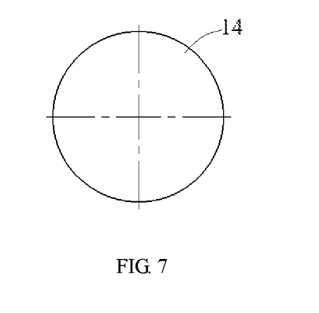
FIG. 7 is a structural schematic diagram of a flow channel with a circular cross section.
Figure 8:
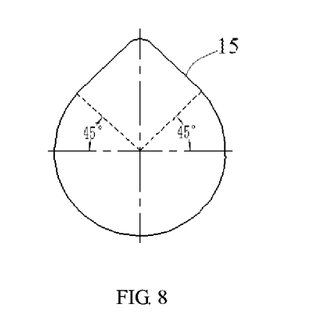
FIG. 8 is a structural schematic diagram of a flow channel with a drop-shaped cross section.

7. Design of a partially drop-shaped flow channel: according to the printing direction preliminarily determined, in order to effectively reduce support structures inside the flow channel and improve the surface quality of the internal flow channel, as shown in FIG. 7, the cross section of the original flow channel 14 is circular. As shown in FIG. 8, a drop-shaped flow channel 15 is designed for the flow channel with the diameter $\varphi \geq 8$ mm. The structural schematic diagram of the drop-shaped flow channel is as shown in FIG. 8.

A right-angle flow channel is taken as an example below to discuss the specific process of parametric optimization of the flow channel structure under each working condition in detail.

Figure 9:
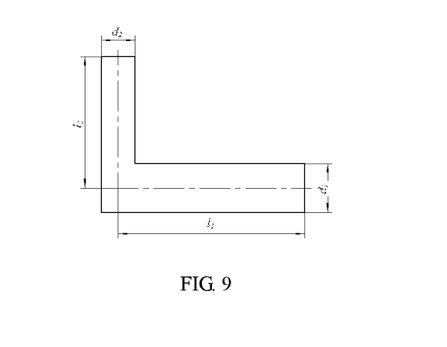
FIG. 9 is a structural schematic diagram of a right-angle flow channel of the machined hydraulic valve block.
Figure 10:
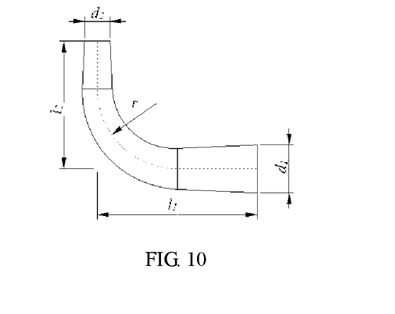
FIG. 10 is a structural schematic diagram of the right-angle flow channel after optimization.

FIG. 9 and FIG. 10 are schematic diagrams of parametric optimization of the right-angle flow channel. First, the 90° right-angle flow channel in design of the machined hydraulic valve block is smoothly transitioned; secondly, the optimized parameters of the partially right-angle flow channel are determined, the optimized parameters of the right-angle flow channel are a large flow channel diameter d1, a small flow channel diameter d2, and a transition radius r; then, the value interval of each optimized parameter is determined, for the large flow channel diameter d1 and the small flow channel diameter d2, their value intervals depend on requirements of the size of the original flow channel and the size of inserted members connected to the original flow channel, and for the transition radius r, its value interval is $0 \leq r \leq \min$; and then, a response surface optimization test is designed, the optimization goal is the minimum pressure loss of the flow channel, and finally structure parameters and model of the flow channel are obtained when the pressure loss is the minimum.

Step 3: Topology optimization design of the solid portions of the hydraulic valve block structure.

It specifically includes:

1. Determination of the non-design space of the hydraulic valve block structure: the relationship between the inner pressure and wall thickness of the flow channel is analyzed to obtain the minimum wall thickness that ensures the flow channel is not broken through by pressure; and meanwhile, the minimum safe wall thickness of the internal flow channel of the valve block is determined according to a design standard for the valve block wall thickness (after the hydraulic valve block is printed and formed, processing of threaded holes and the like in the hydraulic valve block still needs a tapping machine to perform fine processing), and it is taken as the non-design space topologically optimized of the valve block structure;

2. Determination of the optimization goal, design variable, and constraint condition under various working conditions of the valve block structure: the design variable topologically optimized is the unit density of the finite element model in the valve block design space; the optimization goal is the minimum flexibility of the optimized structure, i.e., the maximum rigidity; and the constraint condition is the volume ratio of the structure;

taking the fact that the weight reduction goal is 40% as an example, the mathematical model topologically optimized can be represented as:

optimization goal: $\min C = f(\rho) = F^T U$
design variable: $\rho = \{\rho_1, \rho_2, \ldots, \rho_i, \ldots, \rho_N\}^T \in \Omega_N$
design space: $0 < \rho_{\min} \leq \rho_i \leq 1$ $i=1, 2, \ldots, N$
constraint condition:

$$V^* = \sum_{i=1}^{N} \rho_i v_i = 40\% V$$

$$F = KU$$

where $\rho$ is a design variable, C is the overall flexibility of the structure, F is an applied load, U is a displacement matrix, V is the volume of a design space, V* is the volume after optimization, and K is a global stiffness matrix. In order to prevent the global stiffness matrix from generating singularity, the lower limit $\rho_{min}=0.0015$ of the design variable is introduced.

3. Structure discretization and optimization solution: structure discretization and optimization solution are performed on the hydraulic valve block, if the model converges, a topology form of the valve block model under each working condition is obtained, and an optimization model in a .stl form is output, otherwise, structure discretization and optimization solution are re-performed;

4. Coupling of topologically optimized results: after the optimization model is obtained, Boole summation is performed on the optimization model under each working condition to obtain a topological result mathematical model that satisfies multiple working conditions of the valve block, the form of the model is a .stl form;

5. Post-topology of the model: three-dimensional model reconstruction is performed on the topological result mathematical model in the .stl form obtained in the previous step to obtain the final optimized three-dimensional solid structure model of the hydraulic valve block.

Step 4: performance verification and improvement of the optimized valve block

It specifically includes:

1. Verification of the structural strength of the optimized valve block: finite element analysis software is used to analyze the structural strength of the optimized valve block under extreme working conditions; if there is a structural stress concentration phenomenon, the method is returned to step 3, and partial processing and improvement is performed on the topological model until the structural strength requirements are met;

2. Verification of the service life of the optimized valve block: finite element analysis software is used to analyze the service life of the optimized valve block under extreme working conditions; if the service life does not meet the actual demand, the method is returned to step 3, and partial processing and improvement are performed on the service life requirements are met.

Step 5: printing and testing of the optimized valve block

It specifically includes:

1. Printing of the optimized valve block: the selective laser melting process is used to perform three-dimensional printing and forming of the optimized valve block structure to obtain the finally designed three-dimensional solid model of the optimized structure;

2. Post-processing of the printed valve block: first, heat treatment is performed on the printed valve block to improve the performance stability of the valve block; then, the outer surface and internal flow channel surface treatment is performed on the printed valve block to further improve the surface quality of the optimized valve block;

3. Performance test of the printed valve block: the dimensional accuracy and surface roughness of the printed valve body are detected to determine whether the printed valve block meets the requirements of use.

Figure 11:
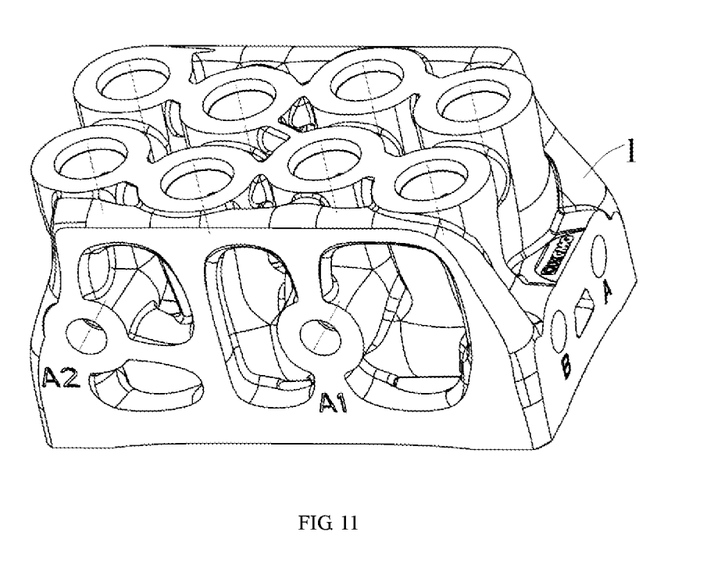
FIG. 11 is a structural schematic diagram of a hydraulic valve block according to embodiments of the present disclosure.

FIG. 11 is a topologically optimized hydraulic valve block structure obtained by using the designing and manufacturing method of this embodiment. The valve body is designed and manufactured by using the metal 3D printing method, and finally the pressure loss of the optimized valve block is reduced by 25% and the weight is reduced by 40%, and meanwhile, the structural strength and service life of the optimized valve body meet actual requirements of use.

It should be illustrated that when an element is referred to as being "fixed to" another element, it can be directly on the another element or can be an intermediate element. When an element is considered to be "connected" to another element, it can be directly connected to the another element or there may be an intermediate element at the same time. In contrast, when an element is referred to as being "directly" "on" another element, there is no intermediate element. The terms "vertical", "horizontal", "left", "right" and similar expressions used herein are merely for the purpose of illustration.

In the description of the present disclosure, the terms "first" and "second" are only used for the purpose of description, and cannot be understood as indicating or implying relative importance.

At the same time, the words such as "upper", "lower", "left", "right", "middle" and "one" quoted in the specification are also only for the convenience of clear narration, instead of being used to limit the implementable scope of the present disclosure, and the change or adjustment of the relative relationship also should be regarded as the implementable scope of the present disclosure without substantially changed technical contents.

What is claimed is:

1. A method of designing and manufacturing a hydraulic valve block based on selective laser melting (SLM), comprising the following steps:

providing a machined hydraulic valve block;

determining whether the machined hydraulic valve block needs weight reduction according to working conditions of the machined hydraulic valve block and a static strength and fatigue strength of the machined hydraulic valve block;

when the machined hydraulic valve block needs weight reduction, an optimization goal of reducing a pressure loss of flow channel and optimizing the flow channel of the machined hydraulic valve block to obtain an optimized flow channel structure model;

an optimization goal of the weight of the hydraulic valve block and optimizing solid portions of the optimized flow channel structure model by using a topology optimization method to obtain a three-dimensional solid structure model of a hydraulic valve block; and printing the three-dimensional solid structure model by using the selective laser melting to obtain the hydraulic valve block.

2. The method of designing and manufacturing the hydraulic valve block based on the selective laser melting according to claim 1, wherein the step of optimizing the flow channel of the machined hydraulic valve block to obtain the optimized flow channel structure model comprises:

splitting the flow channel of the machined hydraulic valve block into at least two sub-flow channel and creating at least two sub-flow channel parameterization models;

parametrically optimizing each sub-flow channel parameterization model to obtain at least two sub-flow channel optimization models; and integrating the at least two sub-flow channel optimization models to obtain the optimized flow channel structure model.

3. The method of designing and manufacturing the hydraulic valve block based on the selective laser melting according to claim 2, wherein the step of optimizing the flow channel of the machined hydraulic valve block to obtain the optimized flow channel structure model further comprises:
after the flow channel of the machined hydraulic valve block is split and before creating the at least two sub-flow channel parameterization models,
removing fabrication holes in the machined hydraulic valve block, and determining optimized parameters of each sub-flow channel to establish sub-flow channel parameterization models.

4. The method of designing and manufacturing the hydraulic valve block based on the selective laser melting according to claim 2,
wherein the step of parametrically optimizing each sub-flow channel parameterization model to obtain the at least two sub-flow channel optimization models comprises:
taking a minimum pressure loss of the flow channel under various working conditions as an optimization goal, and
using a response surface optimization analysis method to obtain the sub-flow channel optimization models in a case that the pressure loss is the minimum.

5. The method of designing and manufacturing the hydraulic valve block based on selective laser melting according to claim 1,
further comprising:
before the solid portions of the flow channel structure model is optimized by using the topology optimization method,
obtaining a minimum wall thickness of the flow channel that ensures the flow channel is not broken through by pressure; and
topologically optimizing parts other than the minimum wall thickness of the solid portion by the topology optimization method.

6. The method of designing and manufacturing the hydraulic valve block based on selective laser melting according to claim 5,
wherein the step of topologically optimizing the parts other than the minimum wall thickness of solid portion by the topology optimization method comprises:
determining the optimization goal,
a design variable, and
constraint conditions under various working conditions of the hydraulic valve block, and
performing structure discretization and optimization on the hydraulic valve block.

7. The method of designing and manufacturing the hydraulic valve block based on the selective laser melting according to claim 6,
wherein a mathematical model topologically optimized can be represented as:
optimization goal: min $C=f(\rho)=F^T U$
design variable: $\rho=\{\rho_1,\rho_2,\ldots,\rho_N\}^T \in \Omega_N$
design space: $0<\rho_{min}>\rho_i>1$ $i=1,2,\ldots,N$
constraint condition:

$$V^* = \sum_{i=1}^{N} \rho_i v_i = A\%V$$

$F=KU$ where p is a design variable,
C is an overall flexibility of the hydraulic valve block,
F is an applied load,
U is a displacement matrix,
V is a volume of the machined hydraulic valve block,
V* is the volume of the hydraulic valve block,
A is a weight reduction goal, and
K is a global stiffness matrix.

8. The method of designing and manufacturing the hydraulic valve block based on selective laser melting according to claim 1,
further comprising:
performing finite element analysis on the three-dimensional solid structure model to obtain the strength and service life of the three-dimensional solid structure model.

* * * * *